(12) United States Patent  
Marabese et al.

(10) Patent No.: US 10,507,778 B2  
(45) Date of Patent: Dec. 17, 2019

(54) COUPLING-RELEASING DEVICE FOR AIRBAG ACTUATOR CABLE FOR VEHICLES WITH TWO OR MORE WHEELS

(71) Applicant: Quadro Vehicles S.A., Vacallo (CH)

(72) Inventors: Riccardo Marabese, Gallarate (IT); Marco Moroni, Marnate (IT)

(73) Assignee: Quadro Vehicles S.A., Vacallo (CH)

( * ) Notice: Subject to any disclaimer, the term of this patent is extended or adjusted under 35 U.S.C. 154(b) by 169 days.

(21) Appl. No.: 15/519,483

(22) PCT Filed: Oct. 22, 2014

(86) PCT No.: PCT/IB2014/065533  
§ 371 (c)(1),  
(2) Date: Apr. 14, 2017

(87) PCT Pub. No.: WO2016/063109  
PCT Pub. Date: Apr. 28, 2016

(65) Prior Publication Data  
US 2017/0240129 A1 Aug. 24, 2017

(51) Int. Cl.  
 *B60R 21/017* (2006.01)  
 *B60R 22/32* (2006.01)  
 (Continued)

(52) U.S. Cl.  
 CPC .......... *B60R 21/017* (2013.01); *A41D 13/018* (2013.01); *B60R 21/33* (2013.01);  
 (Continued)

(58) Field of Classification Search  
 CPC ....... B60R 21/017; B60R 21/18; B60R 21/33; B60R 2021/2338; B60R 2021/0088;  
 (Continued)

(56) References Cited

U.S. PATENT DOCUMENTS 4,413,384 A * 11/1983 Lassche ................ B60R 22/322  
                                                                       24/603  
4,424,509 A * 1/1984 Andres ................. B60R 22/185  
                                                                      116/203  
(Continued)

FOREIGN PATENT DOCUMENTS

| CN | 1517250 | 8/2004 |
|---|---|---|
| CN | 202190774 | 4/2012 |

(Continued)

*Primary Examiner* — Barry Gooden, Jr.  
(74) *Attorney, Agent, or Firm* — Meunier Carlin & Curfman LLC

(57) ABSTRACT

The present invention relates to a coupling-releasing device for airbag actuator cable 1 for vehicles having two or more wheels, said airbag being contained in a wearable jacket or coat. The coupling-releasing device of an airbag actuator cable 1 according to the present invention comprises at least one coupling unit 2,2' adapted to be installed on board a vehicle and actuator means 4,4',4" operatively connected to said at least one coupling unit 2,2' to operate said coupling unit 2,2' between a first closing configuration adapted to retain said end of said airbag actuator cable and a second opening configuration adapted to release said end of said airbag actuator cable.

11 Claims, 1 Drawing Sheet

(51) Int. Cl.
*B60R 21/33* (2006.01)
*A41D 13/018* (2006.01)
*B62J 27/00* (2006.01)
*B60R 21/00* (2006.01)
*B60R 21/01* (2006.01)

(52) U.S. Cl.
CPC ............... *B60R 22/32* (2013.01); *B62J 27/00* (2013.01); *B60R 2021/0088* (2013.01); *B60R 2021/01211* (2013.01); *B60R 2021/01286* (2013.01)

(58) Field of Classification Search
CPC ....... B60R 22/19; B60R 22/32; B60R 22/322; B60R 2022/1812
See application file for complete search history.

(56) References Cited

U.S. PATENT DOCUMENTS

| | | | | |
|---|---|---|---|---|
| 4,790,597 | A * | 12/1988 | Bauer | B60R 22/26 248/429 |
| 6,286,869 | B1 * | 9/2001 | Osendorfer | B60R 22/325 180/286 |
| 7,370,887 | B2 * | 5/2008 | Matsuo | B60R 22/322 280/290 |
| 7,445,235 | B2 * | 11/2008 | Makabe | B60R 21/013 180/271 |
| 8,783,722 | B1 * | 7/2014 | Gallo | B62J 27/00 180/268 |
| 9,061,723 | B2 * | 6/2015 | Chen | A44B 11/2503 |
| 2006/0125206 | A1 * | 6/2006 | Goto | A41D 13/018 280/290 |
| 2007/0069507 | A1 * | 3/2007 | Kobayashi | A41D 13/018 280/733 |
| 2008/0178370 | A1 | 7/2008 | Orita et al. | |
| 2009/0013510 | A1 | 1/2009 | Liang | |

FOREIGN PATENT DOCUMENTS

| | | |
|---|---|---|
| DE | 102006041448 | 3/2007 |
| EP | 166899 A1 | 6/2006 |
| EP | 2673184 A1 | 12/2013 |
| JP | 0966789 | 3/1997 |
| JP | 2003312569 | 11/2003 |
| JP | 2010070112 | 4/2010 |

\* cited by examiner

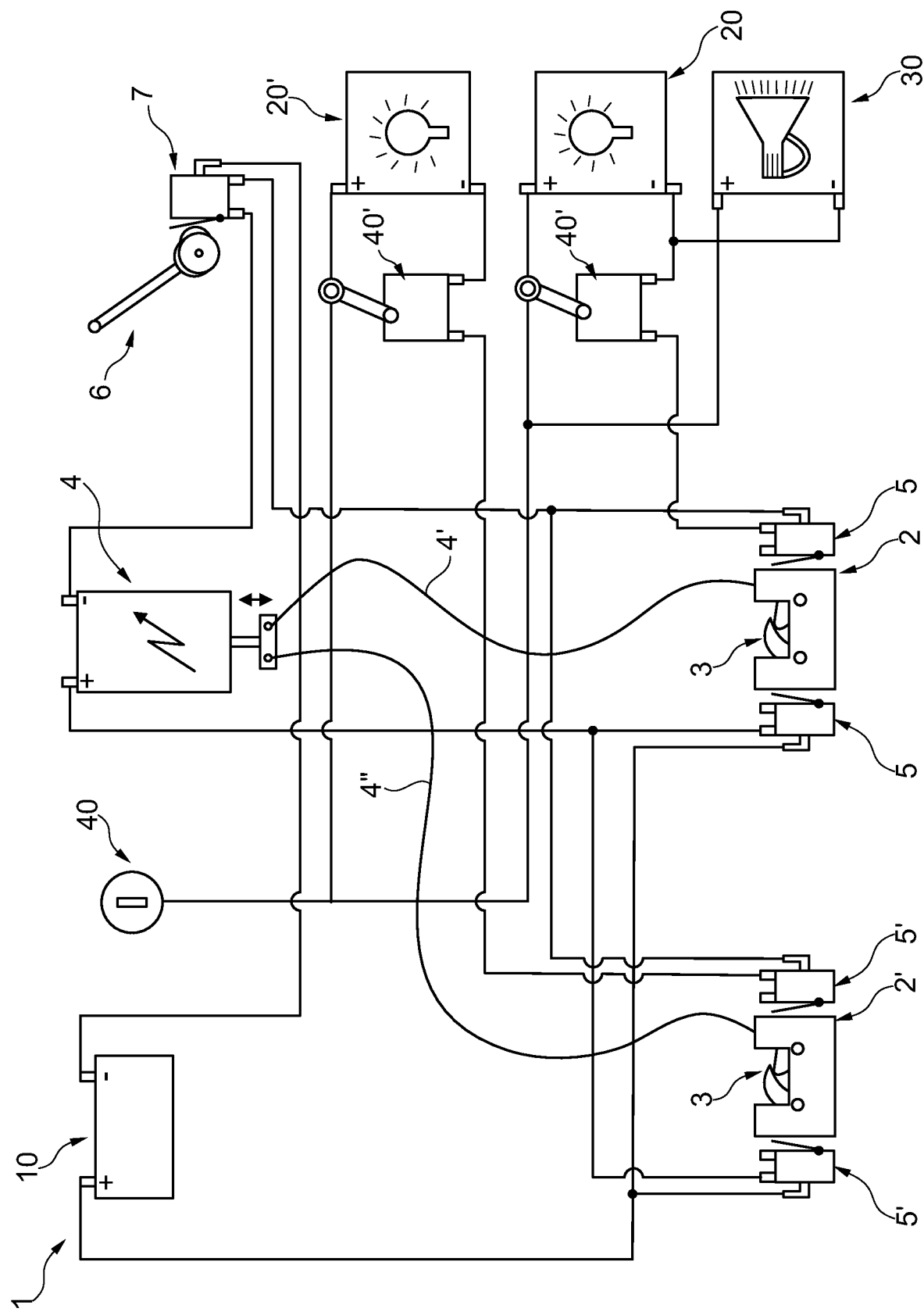

COUPLING-RELEASING DEVICE FOR AIRBAG ACTUATOR CABLE FOR VEHICLES WITH TWO OR MORE WHEELS

CROSS REFERENCE TO RELATED APPLICATIONS

The present application claims priority to PCT International Application No. PCT/IB2014/065533 filed on Oct. 22, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a coupling-releasing device for airbag actuator cable for vehicles having two or more wheels, said airbag being contained in a wearable jacket or coat.
More in particular, the coupling-releasing device for airbag actuator cable according to the present invention also applies to motoscooters with two or more wheels, e.g. motoscooters with three or more wheels and at least two tilting wheels, in addition to two-wheel motorcycles

DESCRIPTION OF THE PRIOR ART

Active and passive safety in the motorcycle field is increasingly more felt and has made enormous progress lately, to the extent that many innovations which were once prohibitively expensive are now widely common because the cost of such technologies is now sufficiently low. Some examples include brake anti-locking systems (ABS), electronic control suspensions, highly ergonomic leather suits with protections made of specifically designed materials, and so on.

In these technologies, full face helmets, protections and airbags for motorcycles in general have enormously contributed to improving passive safety.

The object of the present invention relates to an airbag for motorcycles, in particular to a coupling and releasing device of the actuating cable of a mechanically actuated airbag contained in a garment.

It is also known that mechanically actuated and electronically actuated airbags exist in the motorcycle field.

Mechanically actuated airbags comprise one or more bags folded inside a wearable jacket which are inflated with gas when required after having pulled a cable with a traction force beyond a predetermined threshold value.

The jacket provided with airbag is thus provided with a specific cable which must be secured to the motorcycle by the user; in case of accident, the rider falls and moves away from the motorcycle, the cable will be pulled and will fire the inflatable protection device, which fully inflates in approximately 80 thousands of a second.

System operation is thus simple and now well tested, however it is not very popular on the market, and this is because the users find annoying having a cable which ties them to the motorcycle. Motorcyclists have the impression of being restricted in their movements but above all fear to forget the cable connected to the vehicle when they want to get off, thus causing an involuntary, undesired firing of the airbag, with the evident consequences also in terms of time needed to restore the airbag and of costs for recharging the airbag gas, in addition to the annoyance caused by the temporary unavailability of the jacket and its protection.

Electronically actuated airbags which do not require the traction of a cable to be fired have thus appear on the market: in this type of device, the airbag is electronically actuated by a dedicated system. Obviously, in this case, the system requires the use of accelerometers, batteries for storing electricity and other components, which, in addition to further increasing the weight of the jacket, also increase its costs; the batteries have the drawback of needing to be periodically recharged, thus limiting the possibility to use the jacket by users if they forget to recharge the batteries before the next use.

Consequently, for the reasons illustrated above, electronically actuated airbags are not very common because of their cost and the need to keep them in the correct operating condition, whereas mechanically actuated airbags are seldom used because of the need to have a cable connecting the airbag jacket to the vehicle, which is perceived as an obstacle to freedom of movements, particularly when getting on and getting off the vehicle: indeed, the user must remember to release a carabiner, which connects the airbag actuating cable to a dedicated ring integral with the vehicle, manually.

The known type configuration includes no interaction between vehicle and airbag, nor between vehicle and airbag actuating cable: no system is provided to notify the airbag actuator cable condition (whether it is connected to the vehicle or not), and thus the airbag operating condition, to the user.

Therefore, the known type configuration does not allow users to know whether the actuator cable is correctly connected to the vehicle when they get on and prepare to drive off, nor does it allow users to disconnect automatically when getting off the vehicle, thus preventing the accidental firing of the airbag.

It is the main task of the present invention to provide an airbag actuator cable coupling and releasing device for vehicles having two or more wheels adapted to solve the drawbacks which afflict systems of the known type.

More specifically, the device according to present invention allows the user to know the coupling condition of the airbag actuating cable to the vehicle at all times, thus avoiding undesired airbag actuation.

Indeed, a frequent condition is the one in which the user having stopped the vehicle decides to get off and forgets to disconnect the airbag cable from the vehicle, thus causing an accidental deployment of the airbag.

The device according to the present invention allows to solve this drawback because it provides specific automatic releasing system of the airbag cable from the vehicle when the vehicle is stationary and the user is about to get off.

In the same manner, the device according to the present invention provides specific alarm systems capable of notifying the user of the non-released condition of the cable when the vehicle is in a condition ready for traveling.

Advantageously, the device according to the present invention can detect the connected/not connected condition of the actuation cable for the driver's airbag and the passenger's airbag.

Again, within this task, it is the object of the present invention to provide an airbag actuating cable coupling-releasing device to a motorcycle which provides the possibility for the user to deactivate the alarm systems adapted to communicate the coupling-releasing condition of the actuator cable as needed, preferably with activation-deactivation systems which can be actuated separately and independently for the driver and for the passenger, the systems being automatically reactivated when the cable is coupled again and remain operative until the user decides to deactivate them again.

This task, and these and other objects are achieved by a coupling-releasing device of the airbag actuator cable for motorcycles according to appended claim 1. Further features are described in the dependent claims.

BRIEF DESCRIPTION OF THE DRAWINGS

Further objects and advantages of the present invention will be apparent in the detailed description of an embodiment shown by way of non-limiting example in the accompanying FIG. 1, which diagrammatically shows the coupling-releasing device for airbag actuator cable for motorcycles according to the present invention.

DESCRIPTION OF THE PREFERRED EMBODIMENT

According to a preferred embodiment according to the present invention illustrated hereby way of non-limiting example, the coupling-releasing device for airbag actuator cable 1 for motorcycles comprises at least one coupling unit 2, controlled by actuating means 4 and adapted to retain and release the airbag actuator cable in selective manner. In general, as known in the prior art, the airbag is placed within a garment, typically a jacket, and an actuating cable connected to the airbag actuator ends with coupling means, typically a carabiner or the like. The airbag actuator cable and the coupling means of said cable are not part of the present invention.

Hereinafter, the diagram in FIG. 1 shows a configuration of the device according to the present invention which comprises two coupling units, a first coupling unit 2 and a second coupling unit 2' (the present invention is not limited to the presence of one or two coupling units). One coupling unit may be positioned on the vehicle so as to be used by the driver, while the second unit will be advantageously positioned on the vehicle so as to be used by the passenger.

Each coupling unit 2, 2' may advantageously comprise a supporting block and at least one moveable hook, preferably as shown in the diagram in FIG. 1, a pair of moveable hooks, 3 and 3' respectively, counterpoised and hinged so that the ends of each pair 3, 3' of said hooks may move reciprocally close or away, as diagrammatically shown in the drawing in FIG. 1. When the moveable hooks 3, 3' of one of said coupling units 2, 2' are in the reciprocally approached position, said coupling unit can retain the coupling means of said airbag actuator cable, while when the moveable hooks 3, 3' of one coupling unit 2, 2' are in reciprocally distanced position, said coupling unit is in an open configuration at which the coupling means of the cable are released.

As mentioned, the device further comprises actuator means 4, 4', 4", which advantageously comprise an electric actuator 4 operatively connected by means of a wire 4', 4" or other equivalent system adapted to exert a traction on the hooks of said coupling unit 2, 2'.

More in detail, in the preferred embodiment of the device 1 according to the present invention, each coupling unit 2, 2' comprises a pair of moveable hooks 3, 3', which are hinged to the supporting block and kept in the closing position by a contrast spring. Said electric actuator 4, comprising, for example, a piston having a given stroke, can pull the wire 4, 4', which exerts a traction force on said moveable hooks 3, which rotate, moving reciprocally away and positioning themselves in the opening position of the coupling unit.

Advantageously, said coupling units 2, 2' further comprise closing means of the moveable hooks 3, 3', which cause the moveable hooks 3, 3' to snap closed when an end of the airbag cable is inserted in the coupling unit, as known in the prior art for the locks commonly used, for example to lock the saddle of motoscooters.

In general, in the case of vehicles with three or four wheels, of which at least two tilting, parking means are provided, in particular a parking lever or tiling system lock is provided. When wanting to get off the vehicle, the user must necessarily apply the lock to prevent the vehicle from inclining and falling to the ground. In a preferred embodiment of the present invention, in which the device is applied to vehicles with two or more wheels, said coupling-releasing device 1 for airbag actuating cable may thus comprise a second micro switch 7 operatively connected to said electric motor 4, to said parking lever 6 and to at least one of the first micro switches 5, 5' operatively connected to said coupling unit 2.

The described circuit allows the device 1 according to the present invention to operate said coupling units 2, 2' as a function of the position of the parking lever 6. More specifically, according to the diagram in FIG. 1, when the parking lever 6 is placed in the position corresponding to the locking of the tilting system of the vehicle, the second micro switch 7 is closed, thus sending an electric signal to said actuator means 4, 4', 4" which determine the opening by means of said first micro switches 5, 5', of said coupling units 2, 2'. In traditional two-wheel motorcycles, in which there is no parking lever or tilting system lock, the device according to the present invention as described hereto may be advantageously connected to other parking means, such as the side or center stand of the vehicle. In particular, with reference to the diagram in FIG. 1, the second micro switch 7 will be operatively connected to said stand instead of the lever 6 shown in the diagram.

The operation of the device is the same as illustrated hereto: when the user parks the vehicle and operates the side or center stand to get off and move away from the vehicle, the second micro switch 7 detects the stand down condition and sends an electric signal to the actuating means 4, 4', 4" to determine the automatic opening of the coupling units 2, 2' so that the airbag cable coupling means are freed and the cable is released from the vehicle in automatic manner without the user needing to perform any other action.

Preferably, an electric device (not shown in the diagram in FIG. 1) automatically reactivates the alarms when the cable is coupled into a coupling-releasing unit again, so as to reset the possible exclusion settings of the alarms operated manually by the user in automatic manner.

In an alternative embodiment with respect to the one shown in FIG. 1, the device may advantageously release the cable in automatic manner as soon as the engine is stopped, by means of an operating connection to the ignition key block.

Again with reference to the diagram in FIG. 1, the device according to the present invention, used either on vehicles with two or more wheels (and thus operatively connected to the parking lever), or on two-wheel vehicles (and thus operatively connected to the stand), may advantageously include further signaling means 20, 20', 30 of the operating condition of one or more said coupling units 2, 2'.

More specifically, said signaling means of the operating condition of the coupling unit may comprise visual signals and auditory signals. Advantageously, said signaling means comprise a first working light 20 adapted to signal the operating condition of the unit of the first coupling unit 2 intended to be engaged by the driver, and a second warning light 20' adapted to signal the operating condition of the second coupling unit 2' intended to be used by the passenger. Said signaling means may further comprise auditory alarms, in particular an auditory alarm 30 adapted to signal the operating condition of one or both coupling units 2, 2' in auditory manner.

Preferably, said auditory alarm 30 is adapted to signal the operating condition of the driver's coupling unit 2.

According to a preferred embodiment of the device according to the present invention shown in FIG. 1, said signaling means 20, 20', 30 are advantageously connected to the ignition key block 40 of the vehicle, in addition to the first micro switches 5, 5' operatively associated with said first 2 and second 2' coupling unit.

The operation of the signaling means 20, 20', 30 is thus subordinated to the activation of the ignition key by the user: when the user turns the key to start the vehicle, even before the engine starts, but simply by powering the dashboard, the signaling means 20, 20', 30 receive current and are capable of detecting, by means of the first micro switches 5, 5', the operating condition of the coupling unit.

If the user has not yet inserted the airbag cable coupling means of the coupling unit causing the mechanical closing, the signaling means 20, 20', 30 signal the uncoupled condition to the driver, by lighting the warning light 20, 20' on the dashboard and if present with the activation of the auditory signal 30.

When the user inserts the end of the airbag cable provided with coupling means in one of the two coupling units 2, 2', the closing condition of the moveable hooks 3, 3' is detected by the first micro switches 5, 5' and the corresponding signaling means are deactivated.

Advantageously, further switches 40, 40' may be provided which may be actuated manually by the user and operatively associated with said signaling means 20, 20', 30.

More in detail, a first switch 40 may be associated with said first warning light 20 adapted to signal the operating condition of the first coupling unit 2 used by the driver, and a second switch 40' may be associated with said second warning light 20' adapted to signal the operating condition of the second coupling unit 2'. Possibly, one of the two warning lights, according to the diagram in FIG. 1, the first warning light 20 may be also associated with said auditory signaling means 30.

By means of said switches, the user may manually deactivate the visual and auditory alarms which signal the no airbag cable coupling condition to the coupling units 2, 2'. By means of this function, the user may decide, for example, to deactivate the signaling means of the operating condition associated with the second coupling unit (the passenger's) if the driver is traveling alone, or may deactivate the signaling means associated with the driver's own coupling unit 2 to use the vehicle without wearing the jacket provided with airbag, the signaling means being reactivated automatically when the cable is coupled again and remain operative until the driver decides to deactivate them again.

According to an alternative embodiment of the device according the present invention, the coupling and releasing units 2, 2' may be operated directly from the ignition key block 40 by means of the actuator 4: in this manner, the releasing and coupling units 2, 2' open automatically when the user turns the key to the off position.

Many changes, modifications, variations and other uses and applications of the subject invention will be apparent to a person skilled in the art after having considered the description and the accompanying drawings which illustrate preferred embodiments thereof. Such changes, modifications, variations and other uses and applications which do not differ from the scope of the invention as defined in the appended claims and form an integral part of the text are covered by the present invention.

The invention claimed is:

1. A coupling-releasing device for an airbag actuator cable for a vehicle with two or more wheels, comprising:
   at least one coupling unit adapted to be installed on board of the vehicle, said at least one coupling unit being operable between a closed configuration for retaining an end of the airbag actuator cable and an open configuration for releasing said end of the airbag actuator cable,
   at least one electric actuator connected to said at least one coupling unit to operate said at least one coupling unit between said closed configuration and said open configuration, and
   at least one micro switch which is adapted to detect a position of parking means of the vehicle and is configured to send an electric signal to said at least one electric actuator to operate said at least one coupling unit from said closed configuration to said open configuration when a parked condition of the vehicle is established based on the position of said parking means.

2. The device of claim 1, wherein said at least one coupling unit comprises a first coupling unit intended to be used by a driver of the vehicle and a second coupling unit intended to be used by a passenger of the vehicle.

3. The device according to claim 1, wherein said at least one electric actuator is connected to an ignition key block of the vehicle.

4. The device of claim 1, wherein said at least one coupling unit comprises at least one supporting block adapted to be installed on board of the vehicle and at least one hook moveable between a first closed position adapted to retain said end of said airbag actuator cable and a second opened position adapted to release said end of said airbag actuator cable.

5. The device of claim 4, wherein said at least one coupling unit further comprises closing means adapted to take said at least one hook to the closed position in an automatic manner when said end of said airbag actuator cable is inserted by a user into said at least one coupling unit.

6. The device of claim 5, wherein each of said at least one coupling unit comprises a pair of hooks hinged to the at least one supporting block so ends of said pair of hooks are movable reciprocally towards and away from each other, and wherein closing means comprise a contrast spring for maintaining said pair of hooks in the closed position.

7. The device of claim 6, wherein said at least one electric actuator is connected by means of at least one wire to said pair of hooks and is configured to exert a traction force on said at least one wire sufficient to overcome an action of said contrast spring on said pair of hooks, thus taking said pair of hooks to the opened position.

8. The device of claim 1, further comprising signaling means for signaling an operating condition of said at least one coupling unit.

9. The device of claim 8, wherein said signaling means is connected to an ignition key block of the vehicle.

10. The device of claim 8, wherein said signaling means comprises visual signals and auditory signals.

11. The device of claim 10, wherein said signaling means is connected to an ignition key block of the vehicle.

\* \* \* \* \*